US012761587B2

(12) United States Patent
Kamide

(10) Patent No.: US 12,761,587 B2
(45) Date of Patent: Oct. 13, 2026

(54) FIXATION DEVICE AND IMAGE FORMATION APPARATUS

(71) Applicant: Oki Electric Industry Co., Ltd., Tokyo (JP)

(72) Inventor: Kenta Kamide, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 19/211,279

(22) Filed: May 19, 2025

(65) Prior Publication Data

US 2026/0023339 A1 Jan. 22, 2026

(30) Foreign Application Priority Data

Jul. 18, 2024 (JP) ................................ 2024-114848

(51) Int. Cl.
*G03G 15/20* (2006.01)

(52) U.S. Cl.
CPC ..... *G03G 15/2025* (2013.01); *G03G 15/2064* (2013.01)

(58) Field of Classification Search
CPC ....................... G03G 15/2025; G03G 15/2064
USPC .......................................................... 399/327
See application file for complete search history.

(56) References Cited

U.S. PATENT DOCUMENTS 9,086,661 B2 * 7/2015 Arikawa ............ G03G 15/2025
9,152,099 B2 * 10/2015 Ueno ................ G03G 15/2025

FOREIGN PATENT DOCUMENTS

JP H2-51369 U 4/1990

* cited by examiner

*Primary Examiner* — Hoan H Tran
(74) *Attorney, Agent, or Firm* — METROLEX IP LAW GROUP, PLLC; Robert L. Scott, Esq.

(57) ABSTRACT

A fixation device according to an embodiment may include: a first rotation member extending in a first direction; a plurality of cleaning members each of which includes an elastic body to clean the first rotation member; and a biasing mechanism that biases the plurality of cleaning members toward the first rotation member. The plurality of cleaning members includes: first and second cleaning members including first and second support bodies and first and second elastic bodies supported by the support bodies, respectively. In the first direction, a second contact area where the second elastic body contacts the first rotation member includes an overlapping region that overlap a first contact area where the first elastic body contacts the first rotation member. The bias mechanism includes a bias member that applies a biasing force to the first support body in a region different from the overlapping region in the first direction.

8 Claims, 12 Drawing Sheets

FIXATION DEVICE AND IMAGE FORMATION APPARATUS

CROSS REFERENCE TO RELATED APPLICATIONS

This application claims priority based on 35 USC 119 from prior Japanese Patent Application No. 2024-114848 filed on Jul. 18, 2024, entitled "FIXATION DEVICE AND IMAGE FORMATION APPARATUS", the entire contents of which are incorporated herein by reference.

BACKGROUND

The disclosure may relate to an image formation apparatus, and more particularly, to a fixation device equipped with a cleaning function.

In the related art, a fixation device including a cleaning member that cleans a rotation member is known (see, for example, Patent document 1: Japanese Utility Application Publication No. 2-51369 (p. 5, FIG. 1))

SUMMARY

However, when continuously printing on media of a specific width, the developer may accumulate on a particular area of the cleaning member in the axial direction of the rotation member, potentially resulting insufficient cleaning. An object of an aspect of one or more embodiments may be to provide a fixation device capable of reducing the occurrence of such insufficient cleaning.

An aspect of the disclosure may be a fixation device that may include: a first rotation member extending in a first direction; a plurality of cleaning members which are arranged in a circumferential direction of the first rotation member and each of which includes an elastic body configured to be in contact with the first rotation member to clean the first rotation member; and a biasing mechanism that biases the plurality of cleaning members toward the first rotation member. The plurality of cleaning members includes: a first cleaning member including a first support body and a first elastic body supported by the first support body; and a second cleaning member including a second support body and a second elastic body supported by the second support body. In the first direction, a second contact area where the second elastic body contacts the first rotation member includes an overlapping region that overlap a first contact area where the first elastic body contacts the first rotation member. The overlapping region includes a position corresponding to a widthwise end of a predetermined-size medium that is subjected to fixing process of the fixation device. The bias mechanism includes a bias member that applies a biasing force to the first support body in a region different from the overlapping region in the first direction.

According to the above-described aspect, it may be possible to clean the first rotation member across a predetermined area in the first direction.

DETAILED DESCRIPTION

Figure 1:
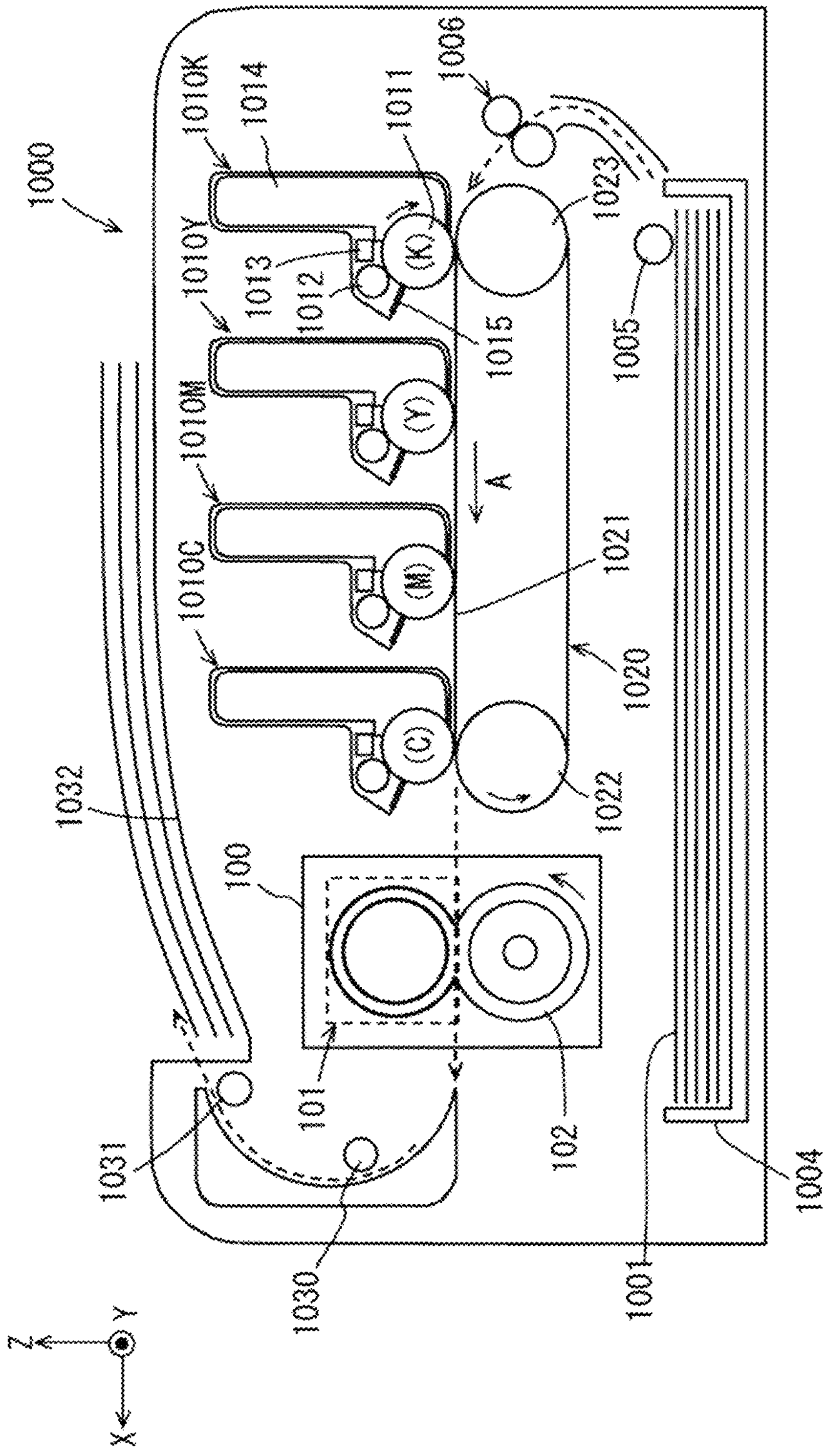
FIG. 1 is a schematic view of a configuration of a main portion of an image formation apparatus including a fixation device according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

FIG. 1 is a schematic view of a configuration of a main portion of an image formation apparatus 1000 including a fixation device 100 according to a first embodiment.

The image formation apparatus 1000 illustrated in FIG. 1 is configured, for example, as a color electrophotographic printer. The image formation apparatus 1000 includes therein: a paper feed cassette 1004 configured to store therein recording paper 1001 as recording media; a paper feed roller 1005 configured to take out the recording paper 1001 from the paper feed cassette 1004; and a resist roller pair 1006 configured to feed the recording paper 1001 to an image formation section at a certain timing.

The image formation apparatus 1000 includes an image formation section that includes: a development device 1010K configured to form a black (K) toner image; a development device 1010Y configured to form a yellow (Y) toner image; a development device 1010M configured to form a magenta (M) toner image; and a development device 1010C configured to form a cyan (C) toner image, in such a manner that the development devices 1010K, 1010Y, 1010M, and 1010C are arranged in that order from an upstream side along a conveyance path of the recording paper 1001. Note that the development devices 1010K, 1010Y, 1010M, and 1010C may be simply referred to as development devices 1010 when there is no particular need to distinguish among them. These development devices 1010 have the same configuration, except for the colors of the toners used therein.

For example, as in the development device 1010K that uses black (K) toner, illustrated in FIG. 1, each development device 1010 includes: a photosensitive drum 1011 that serves as an electrostatic latent image carrier; a charging device 1012 configured to apply an electric charge to a surface of the photosensitive drum 1011, and an exposure device 1013 configured to selectively irradiate light based on image data onto the surface of the photosensitive drum 1011 thereby forming an electrostatic latent image on the surface of the photosensitive drum 1011; a developer supply device 1014 configured to supply the toner to develop the electrostatic latent image on the photosensitive drum 1011 to form a toner image; and a cleaning device 1015 disposed in contact with the photosensitive drum 1011 and configured to remove the toner remaining on the surface of the photosensitive drum 1011. These components—the charging device 1012, the exposure device 1013, the developer supply device 1014, and the cleaning device 1015—are arranged around the photosensitive drum 1011 in this order from the upstream side in a rotational direction (see the arrow in FIG. 1) of the photosensitive drum 1011.

The image formation apparatus 1000 also includes therein a belt-type transfer device 1020, which includes: an endless transfer belt 1021 configured to convey the recording paper 1001 to sequentially transfer the toner images formed by the respective development devices onto the conveyed recording paper 1001; a drive roller 1022 configured to be rotated by a driver (not illustrated) and drive the endless transfer belt 1021 in the direction of the arrow A; and a tension roller 1023 paired with the drive roller 1022 and configured to apply tension to the endless transfer belt 1021, thereby stretching the endless transfer belt 1021 between the drive roller 1022 and the tension roller 1023.

The fixation device 100 is provided on the discharge side of the endless transfer belt 1021 in the conveyance direction of the recording paper 1001. The fixation device 100 includes a fixation belt unit 101 and a pressure roller 102, and is configured to fix the toner transferred onto the recording paper 1001 to the recording paper 1001 by applying heat and pressure. On the discharge side of the fixation device 100, conveyance rollers 1030 and 1031 are provided to discharge the printed recording paper 1001 that is discharged from the fixation device 100 to a discharged paper stacker 1032. Details of the fixation device 100 will be described later.

Note that, with regard to the X, Y, and Z directions in FIG. 1, the X direction corresponds to the conveyance direction (the direction of the arrow A) in which recording paper 1001 passes through the development devices 1010C, 1010M, 1010Y, and 1010K, the Y direction is parallel to the rotation axis of each photosensitive drum 1011, and the Z direction is perpendicular to both of the X and Y directions. The X, Y, and Z directions are also illustrated in the other figures described below, and represent the same directions as in FIG. 1. In other words, the X, Y, and Z directions in each figure indicate the directions of arrangement of the image formation apparatus 1000 illustrated in FIG. 1. Note that the Z direction is oriented in a substantially vertical direction.

Next, an overview of the printing operation of the image formation apparatus 1000 having the above-described configuration is described with reference to FIG. 1. Note that the dotted arrows in FIG. 1 indicate the conveyance direction of the recording paper 1001 as being conveyed.

When an operator performs a well-known operation to start image formation with the power supplied to the image formation apparatus 1000, the apparatus 1000 feeds the recording paper 1001, stored in the paper feed cassette 1004, to the conveyance path by the paper feed roller 1005, corrects the skew by the resist roller pair 1006, and then conveys the recording paper 1001 to the image formation section including the four development devices 1010 and the transfer device 1020 at a predetermined timing.

As the photosensitive drum 1011 rotates in its rotation direction (the direction indicated by the arrow in the figure), the charging device 1012, to which a voltage is applied by a power supply device (not illustrated), charges the surface of the photosensitive drum 1011 in each development device 1010. Then, when the charged surface of the photosensitive drum 1011 reaches the vicinity of the exposure device 1013, the exposure device 1013 emits lights corresponding to the image information to form an electrostatic latent image on the charged surface of the photosensitive drum 1011. The developer supply device 1014 develops the electrostatic latent image on the surface of the photosensitive drum 1011 with the toner thereof, thereby forming the toner image of the corresponding color on the surface of the photosensitive drum 1011.

The recording paper 1001 conveyed to the image formation section is adsorbed onto the endless transfer belt 1021 and is conveyed by the belt 1021 in the direction of the arrow A. While being conveyed on the endless transfer belt 1021, the recording paper 1001 is sequentially nipped between the belt 1021 and the photosensitive drums 1011 of the respective development devices 1010 rotating in the arrow direction in the figure. In the sequential nipping process, the toner images of black (K), yellow (Y), magenta (M), and cyan (C), formed on the corresponding photosensitive drums 1011, are sequentially transferred onto the recording paper 1001 at predetermined timings in a superimposed manner, thereby forming a color image (a multi-color image) composed of the respective color toner images on the recording paper 1001. After residual toner remaining on the photosensitive drum 1011 after the transfer is scraped off and cleaned by the cleaning device 1015, the photosensitive drum 1011 is charged for the next toner image formation.

Then, the recording paper 1001, on which the color image composed of the respective color toner images is formed, is conveyed to the fixation device 100. Then, the fixation device 100 applies pressure and heat to the toner images on the recording paper 1001, thereby melting and fixing the toner images onto the recording paper 1001. The recording paper 1001 is then discharged by the conveyance rollers 1030 and 1031 to the discharged paper stacker 1032, so that the printing operation is completed.

Figure 2:
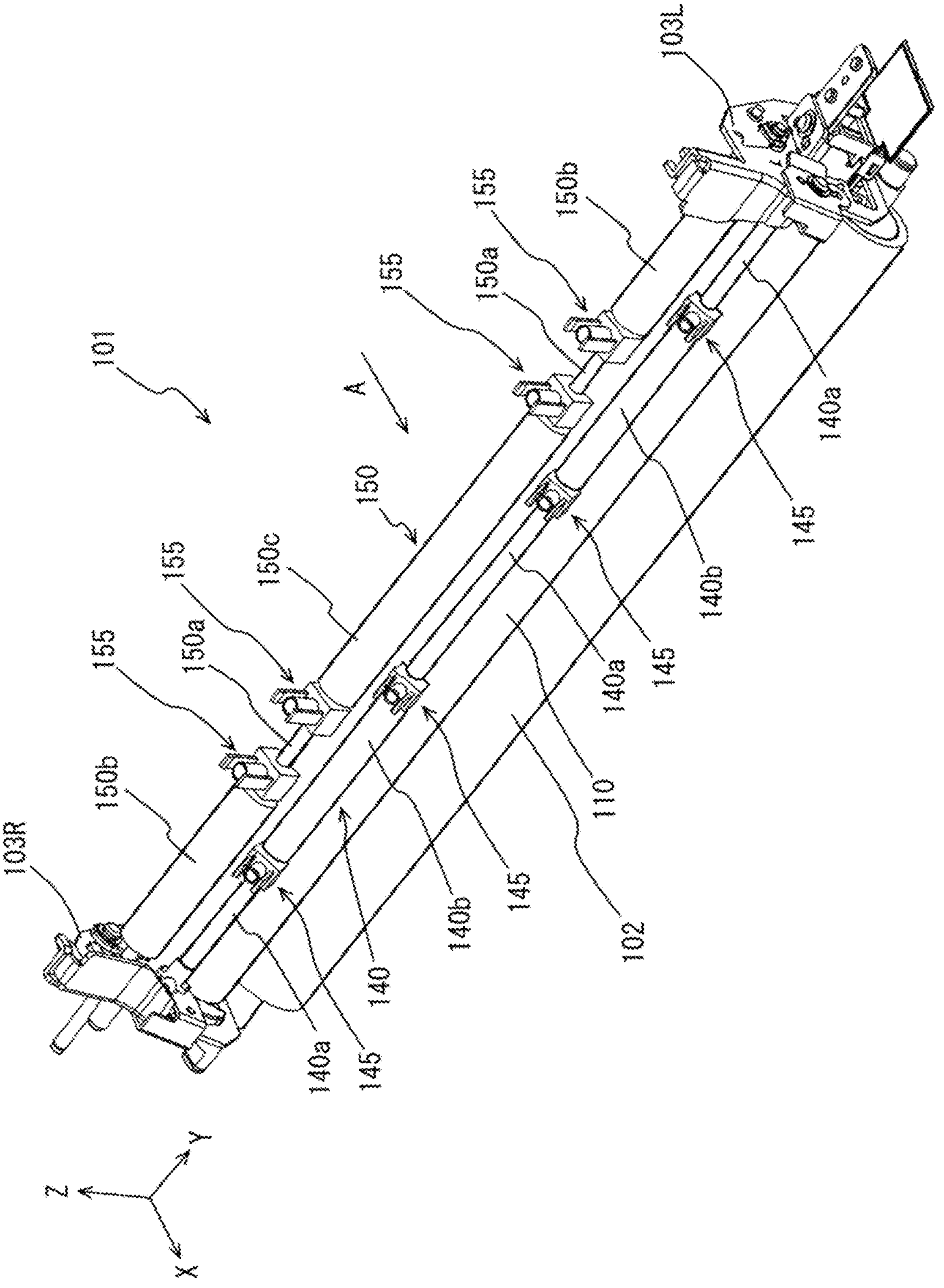
FIG. 2 is an external perspective view of a fixation belt unit and a pressure roller, which constitute a main portion of the fixation device.
Figure 3:
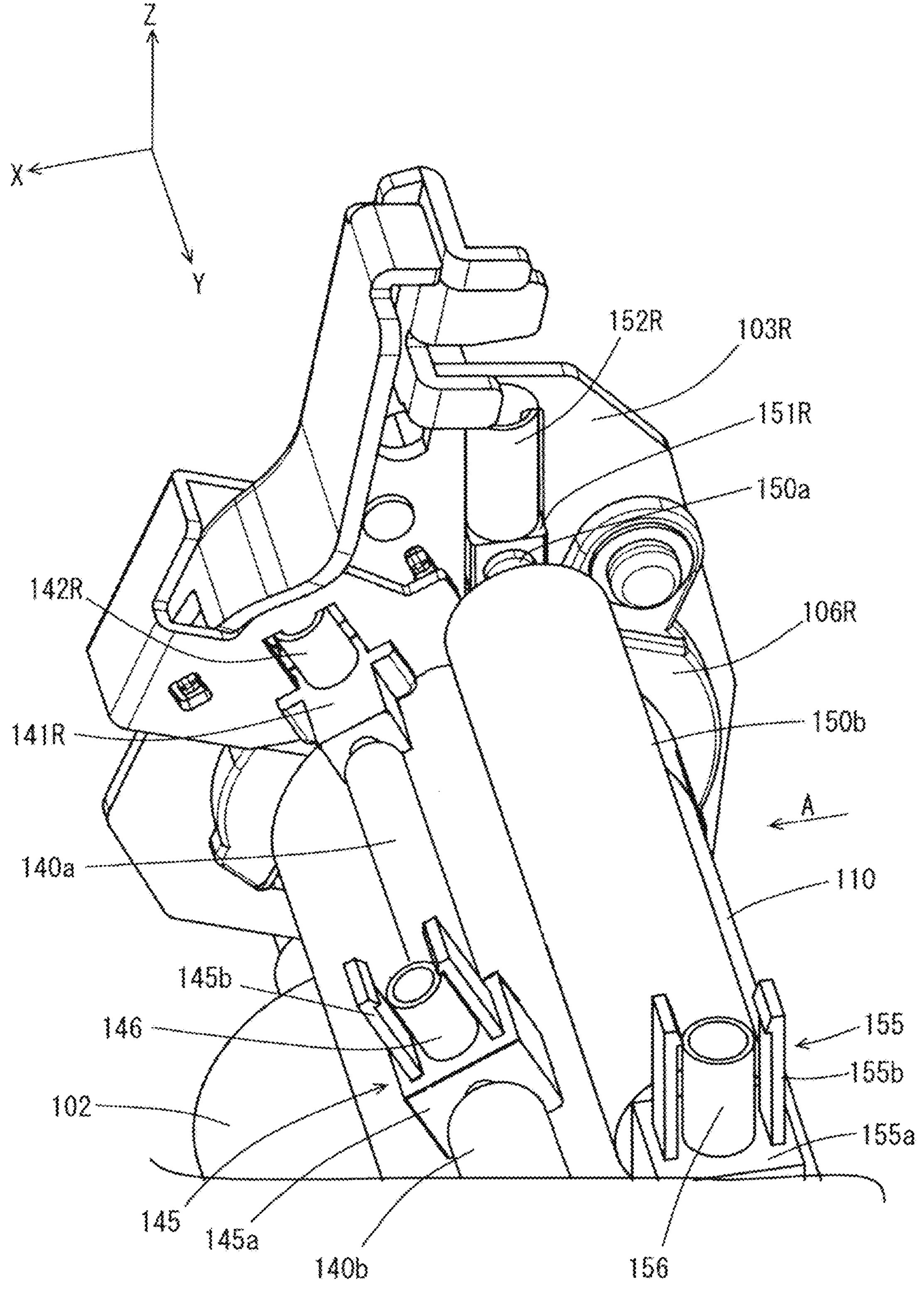
FIG. 3 is an enlarged view illustrating the vicinity of right end portions of the fixation belt unit and the pressure roller, viewed from an angle different from that of FIG. 2.
Figure 4A:
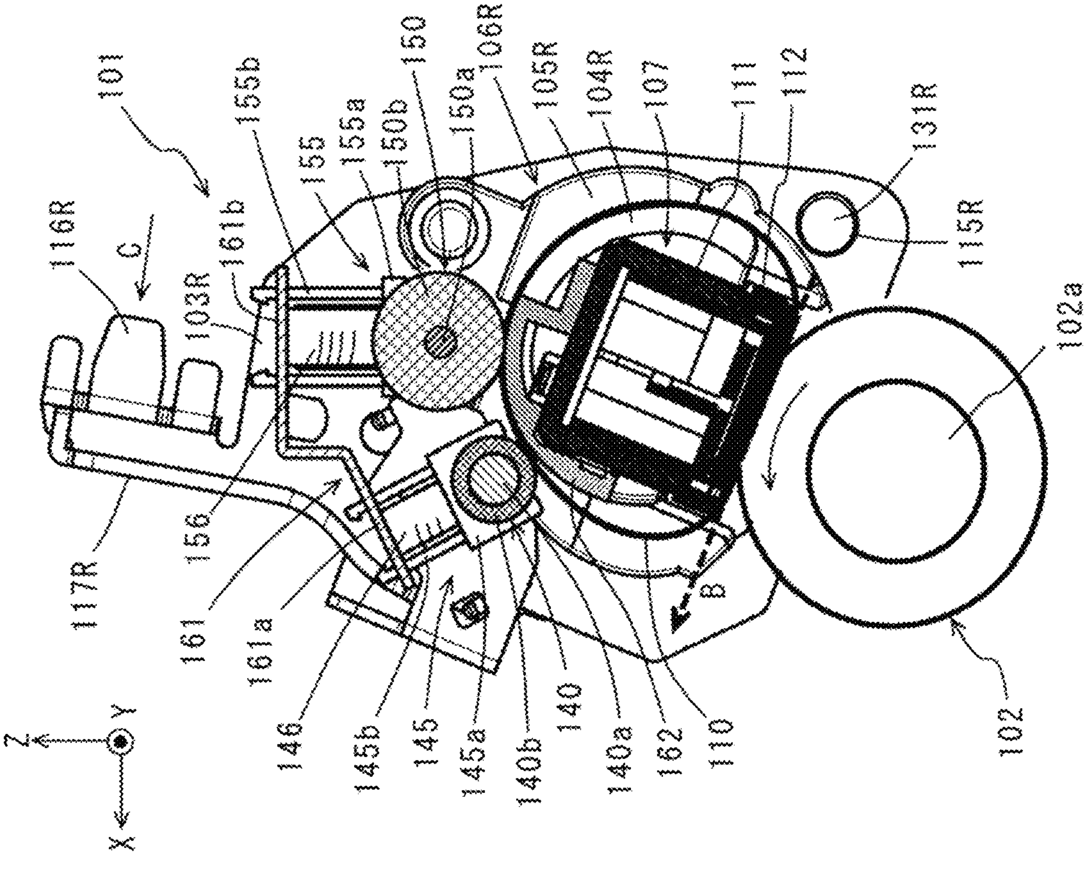
FIG. 4A is a cross-sectional view of the main portion of the fixation device illustrated in FIG. 2, taken along the center portion in the width direction and viewed from the left side.
Figure 4B:
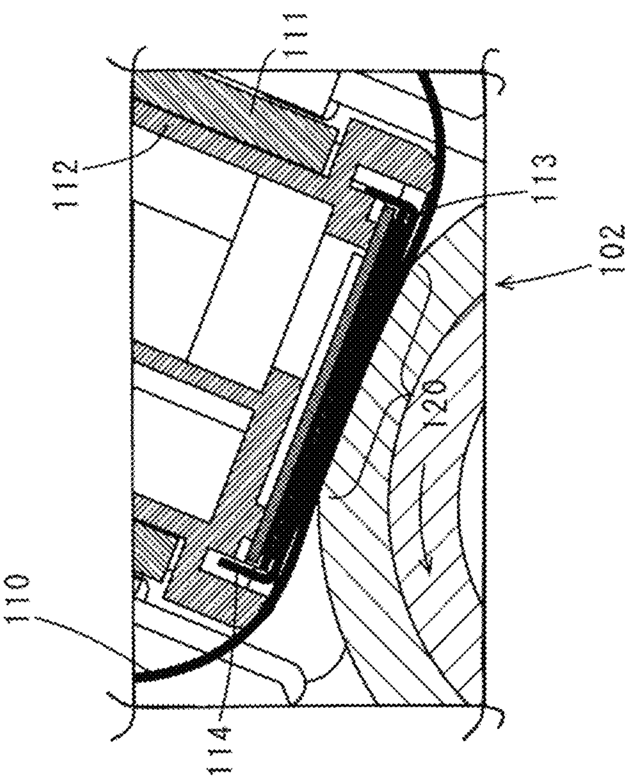
FIG. 4B is an enlarged view of the vicinity of a nip portion illustrated in FIG. 4A.

FIG. 2 is an external perspective view of the fixation belt unit 101 and the pressure roller 102, which constitute a main portion of the fixation device 100. FIG. 3 is an enlarged view illustrating the vicinity of right end portions of the fixation belt unit 101 and the pressure roller 102, viewed from an angle different from that of FIG. 2. FIG. 4A is a cross-sectional view of the main portion of the fixation device 100 illustrated in FIG. 2, taken along the width center, viewed from the left side. FIG. 4B is an enlarged view of the vicinity of a nip portion in FIG. 4A. Note that the directions may be specified as upper (the positive direction of the Z axis), lower, left, right, front, and rear as viewed from the X direction (the direction of arrow A) illustrated in FIG. 2.

As illustrated in these figures, in the fixation device 100, both the pressure roller 102 and the fixation belt unit 101 extend in the Y direction. The fixation belt unit 101 is located above the pressure roller 102 and equipped with a fixation belt 110 having an endless shape. The fixation belt 110 includes, on its inner surface, a metal or resin layer as a base member, an elastic layer of silicone rubber on the outer side of the base material, and a PFA tube on the surface layer. The pressure roller 102 includes, sequentially from its center, a metal hollow core, an elastic layer, and a PFA tube layer as an outermost surface layer.

In the fixation belt unit 101, a heater unit 107 is provided inside the fixation belt 110 serving as a first rotation member extending in the Y direction. The heater unit 107 extends in the same direction as the fixation belt 110 and is configured to heat the fixation belt 110 from its inner side. The inner surface of the fixation belt 110 is coated with sliding grease. The Y direction, which is the first direction in which the fixation belt 110 extends, may be referred to as the longitudinal direction, or the width direction of the recording paper 1001.

The pressure roller 102 is rotatably supported at both end portions of the rotation shaft 102a of the pressure roller 102 by a frame (not illustrated) of the fixation device 100, and is driven in the arrow direction (counterclockwise) in FIG. 4 by a rotational driving force from an external source. Note that the frame holds components, such as the pressure roller 102 and fixation belt unit 101, in place by left and right side plates (not illustrated) thereof.

As illustrated in FIGS. 4A and 4B, the heater unit 107, located on the inner side of the fixation belt 110, includes a metal stay 111. The stay 111 is formed in a U-shaped in the cross-section and extends across the fixation belt 110, projecting beyond both ends of the fixation belt 110 in the Y direction. The stay 111 is fixedly held by a metal right support lever 103R at the position beyond the right end of the fixation belt 110 in the Y direction and is also fixedly held by a metal left support lever 103L (FIG. 2) at the position beyond the left end of the fixation belt 110 in the Y direction.

The right support lever 103R holds a right guide member 106R made of heat-resistant sliding resin. The right guide member 106R includes a right inner guide portion 104R, which guides the upper part of the right end portion of the fixation belt 110 from inside the fixation belt 110, and a right regulatory portion 105R, which regulates rightward movement of the fixation belt 110. Similarly, the left support lever 103L holds a left guide member (not illustrated). The left guide member includes a left inner guide portion (not illustrated), which guides the upper part of the right end portion of the fixation belt 110 from inside the fixation belt 110, and a left regulatory portion (not illustrated), which regulates leftward movement of the fixation belt 110.

Note that the configuration of components at the left end portion of the fixation belt unit 101 is the same as or similar to that the configuration of components at the right end portion of the fixation belt unit 101 such as the right support lever 103R, the right guide member 106R, the heater unit 107, and an opposing member 162, including the right side plate (not illustrated) of the frame. In other words, these are formed substantially symmetrically with respect to an imaginary center plane that perpendicularly intersects the center of the longitudinal direction (Y direction) of the fixation belt unit 101.

Accordingly, the reference signs of components at the left and right end portions that are arranged symmetrically with respect to each other may be suffixed with "L" or "R" to distinguish between the left and the right, for example, the left support lever 103L and the right support lever 103R. Note that when there is no particular need to distinguish between the left and right sides, these suffixes may be omitted, and the components may be referred to without the suffixes, for example, as "support lever 103". In addition, for the components at the left and right end portions of the fixation belt unit 101 that are arranged in plane symmetry, only the configurations at the right end portion may be mainly described in the disclosure, and descriptions of the configurations at the left end portion may be omitted for avoiding redundancy.

The stay 111 holds a heater holder 112, which holds a thin plate heater 113 extending in the width direction, as illustrated in FIG. 4B. The left and right end portions of the stay 111 are fixedly held by left and right support levers 103. The heater 113 is located at a bottom portion of the heater holder 112, as illustrated in FIG. 4B, for example, with a thermistor (not illustrated) for detecting an over-temperature of the heater and a thermistor protection plate (not illustrated) that protect the thermistor. A bottom surface of the heater 113 is further covered by a heat diffusion plate 114 attached to the heater holder 112. Therefore, the right support lever 103R, the right guide member 106R, and the right end portion of the heater unit 107 are integrally configured.

As illustrated in FIG. 4, the fixation belt unit 101 is configured such that a right pivot hole 115R is formed at a lower end portion of the right support lever 103R and a right pivot (rotation fulcrum) 131R of the frame (not illustrated) is fitted in the right pivot hole 110R. As a result, the fixation belt unit 101 is supported by the frame (not illustrated) of the fixation device 100 such that the fixation belt unit 101 is rotatable about the rotation pivot 131.

The fixation belt unit 101, configured as described above, is biased in the direction of arrow C by a compression spring (not illustrated) bridged between a right spring retainer 116R and the frame (not illustrated). The fixation belt unit 101 is further equipped with a first cleaning roller 140, a second cleaning roller 150, etc., which are described in detail later.

As illustrated in FIG. 4B, this biasing force causes a lower flat portion of the heat diffusion plate 114, which transfers heat to the fixation belt 110, to press against an elastic outer circumferential surface of the pressure roller 102 through the fixation belt 110, thereby forming a nip portion 120 therebetween. In this state, when the pressure roller 102 rotates in the arrow direction, the fixation belt 110 also rotates together with the pressure roller 102.

The fixation belt 110 rotates in a clockwise direction following the rotation of the pressure roller 102 while the inner surface of the fixation belt 110 is guided at the left and right end portions of the fixation belt 110 by the left and right guide members 106. Note that the movement (rotation) of the fixation belt 110 may be referred to as rotational movement.

As described above, after the transfer of the toner images is completed on the recording paper 1001, the recording paper 1001 passes through the nip portion 120 in the direction indicated by the dotted arrow B (FIG. 4A). In the course of passing the recording paper 1001 through the nip portion 120, the transferred toner images are fixed to the recording paper 1001 by the heat and pressure that the recording paper 1001 receives. Then, the recording paper 1001 having the toner images fixed thereon is discharged from the fixation device 100. To the contrary, to separate the fixation belt 110 from the pressure roller 102, a right contact flat surface portion 117R is pressed by a cam or the like (not illustrated), causing the fixation belt unit 101 to rotate in the clockwise direction, thereby separating the fixation belt 110 from the pressure roller 102.

In addition to the above-described components, the fixation belt unit 101 is further equipped with the first cleaning roller 140, the second cleaning roller 150, etc. These configurations are described in detail below. Note that the first cleaning roller 140 and the second cleaning roller 150 serve as cleaning members.

The first cleaning roller 140, serving as a first cleaning member, includes: a shaft 140*a*, serving as a first support, which is made of metal and extends in the longitudinal direction (the arrow Y direction); and elastic layers 140*b*, serving as a first elastic body, which surrounds the shaft 140*a* and are formed in a roller shape from silicone rubber, heat-resistant felt, or a similar material. The elastic layers 140*b* do not cover the entire length of the shaft 140*a* in the axial direction as illustrated in FIG. 2; rather, within the area corresponding a maximum printable paper width Aw (see FIG. 5) defined by the apparatus (hereinafter may be referred to as a maximum printable paper width Aw), there are portions of the shaft 140*a* that remain exposed (i.e., not covered by the elastic layers 140*b*).

Both end portions of the metal shaft 140*a* are rotatably supported by shaft retainers (pivot retainers). For example, on the right side as illustrated in FIG. 3, the right end portion of the metal shaft 140*a* is rotatably supported by the right shaft retainer 141R, and the right shaft retainer 141R is slidably held by the right support lever 103R. Thus, the first cleaning roller 140, which is rotatably supported by the shaft retainers, is slidably movable to come in contact with and separate away from the fixation belt 110. Furthermore, the shaft retainer 141R is biased by a compression spring 142R bridged between the shaft retainer 141R and the right support lever 103R.

Similarly, the second cleaning roller 150, which serves as a second cleaning member, includes: a shaft 150*a* (see FIG. 4A), serving as a second support body, which is made of metal and extends in the longitudinal direction (the arrow Y direction); and elastic layers 150*b*, serving as a second elastic body, which surrounds the shaft 150*a* and are formed in a roller shape from silicone rubber, heat-resistant felt, or a similar material. The elastic layers 150*b* do not cover the entire length of the shaft 150*a* in the axial direction as illustrated in FIG. 2; rather, within the area corresponding to the maximum printable paper width Aw (see FIG. 5), there are portions of the shaft 150*a* that remain exposed (i.e., not covered by the elastic layers 150*b*).

Both end portions of the metal shaft 150*a* are rotatably supported by shaft retainers (pivot retainers). For example, on the right side as illustrated in FIG. 3, the right end portion of the metal shaft 150*a* is rotatably supported by the right shaft retainer 151R, and the right shaft retainer 151R is slidably held by the right support lever 103R. Thus, the second cleaning roller 150, which is rotatably supported by the shaft retainers, is slidably movable to come in contact with and separate away from the fixation belt 110. Furthermore, the shaft retainer 151R is biased by a compression spring 152R bridged between the shaft retainer 151R and the right support lever 103R.

As illustrated in FIG. 2, the first cleaning roller 140 is provided with pressure members 145 at positions (four positions in this case) corresponding to portions of the shaft 140*a* that are not covered by the elastic layers 140*b* and facing in the axial direction both edges of each elastic layer 140*b*. As illustrated in FIG. 4A, each of the pressure members 145 includes: a shaft pressing portion 145*a*, through which the shaft 140*a* passes and rotatably supports the shaft 140*a*; and a pair of arm portions 145*b* that are integrally formed with the shaft pressing portion 145*a* and are movably supported by an upper frame 161 in the vertical direction, as described below.

Similarly, the second cleaning roller 150 are provided with pressure members 155 at positions (four positions in this case) corresponding to portions of the shaft 150*a* that are not covered by the elastic layer 150*b* and facing in the axial direction both edges of each elastic layer 150*b*. As illustrated in FIG. 4A, each of the pressure members 155 includes: a shaft pressing portion 155*a*, through which the shaft 150*a* passes and which rotatably holds the shaft 150*a*; and a pair of arm portions 155*b* that are integrally formed with the shaft pressing portion 155*a* and are movably supported by the upper frame 161 in the vertical direction, as described below.

The upper frame 161, which holds the pressure member 145 and the pressure member 155, extends in the longitudinal direction (the arrow Y direction) and is bridged between the left and right support levers 103R and 103L such that both ends of the upper frame are held integrally by the support levers 103R and 103L. Note that the upper frame 161 is omitted from FIGS. 2 and 3 in order to illustrate the structures of each component more clearly; however, a cross-sectional view or similar representation of the upper frame 161 is illustrated in FIG. 4A.

As illustrated in the cross-sectional view in FIG. 4A, the upper frame 161 includes a first support portion 161*a*, which holds each of the pressure members 145, a second support portion 161*b*, which holds each of the pressure members 155, and a connecting portion, which connects the first and second support portions. The first support portion 161*a* of the upper frame 161 holds the four pressure members 145 as illustrated in FIG. 2, and all of the pressure members 145 are held in the same configuration and holding method. Therefore, to avoid redundancy, the holding method may be explained only for the pressure member 145 that is illustrated in FIG. 4A, as an example.

The first support portion 161*a* of the upper frame 161 includes guide holes (not illustrated) through which the pair of arm portions 145*b* of the pressure member 145 pass at opposing positions, such that the first support portion 161*a* holds the pressure member 145 to be slidably movable. Thus, along with the slide movement of the pressure members 145 with respect to the upper frame 161, the elastic layers 140*b* of the first cleaning roller 140, which is rotatably held by the pressure members 145, come in contact with and separate away from the fixation belt 110. In addition, a compression spring 146 is bridged between the first support portion 161*a* of the upper frame 161 and the shaft pressing portion 145*a* of each of the pressure members 145. Accordingly, the elastic layers 140*b* of the first cleaning roller 140 are in contact with the surface of the fixation belt 110 at a predetermined pressure due to the biasing force exerted by the compression springs 142 and the compression springs 146.

Similarly, the second support portion 161*b* of the upper frame 161 holds the four pressure members 155 as illustrated in FIG. 2, and all of the pressure members 155 are held in the same configuration and holding method. Therefore, to avoid redundancy, the holding method may be explained only for the pressure member 155 that is illustrated in FIG. 4A, as an example.

The second support portion 161*b* of the upper frame 161 includes guide holes (not illustrated) through which the pair of arm portions 155*b* of the pressure member 155 pass at opposing positions, such that the second support portion 161*b* holds the pressure member 155 to be slidably movable. Thus, along with the slide movements of the pressure members 155 with respect to the upper frame 161, the elastic layers 150*b* of the second cleaning roller 150, which is rotatably held by the pressure members 155, come in contact with and separate away from the fixation belt 110. In addition, a compression spring 156 is bridged between the second support portion 161*b* of the upper frame 161 and the shaft pressing portion 155*a* of each of the pressure members 155. Accordingly, the elastic layers 150*b* of the second cleaning roller 150 is in contact with the surface of the fixation belt 110 at a predetermined pressure due to the biasing force exerted by the compression springs 152 and the compression springs 156.

The opposing member 162 (FIG. 4A) is provided on the inner side of the fixation belt 110, and supports the fixation belt 110 from the inside against the pressure applied from the first cleaning roller 140 and the second cleaning roller 150.

The opposing member 162 is fixed to the stay 111 and extends in the same direction (Y-direction) across and beyond the area of the maximum printable paper width Aw (see FIG. 5) such that it supports the rotational movement of the fixation belt 110 from the inside in an area including positions opposite the first cleaning roller 140 and the second cleaning roller 150. Accordingly, when the fixation belt 110 rotates in the clockwise direction, both the first cleaning roller 140 and the second cleaning roller 150 rotate in the counterclockwise direction, following the rotational movement of the fixation belt 110 (see FIG. 4A).

Figure 5:
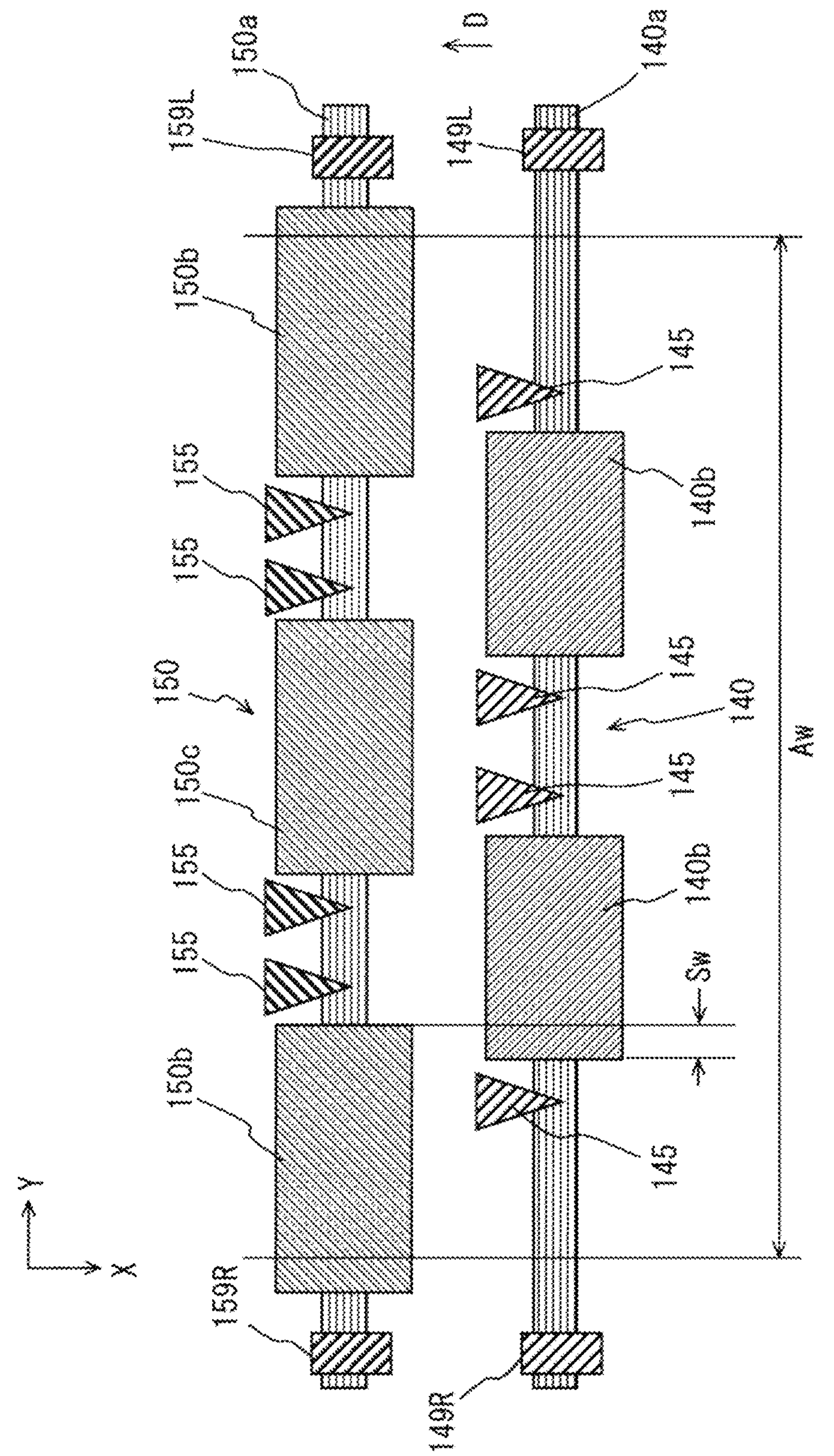
FIG. 5 is a schematic plan view for explaining the positional relationship in the longitudinal direction (Y direction) between a first cleaning roller, a second cleaning roller, and a maximum printable paper width Aw defined by the apparatus.

FIG. 5 is a plan schematic diagram for explaining the positional relationship in the longitudinal direction (Y direction) of the first cleaning roller 140 and the second cleaning roller 150 illustrated in FIG. 2, and the maximum printable paper width Aw.

In the arrow D direction in FIG. 5, which indicates the rotation direction of the fixation belt 110, the row in which the first cleaning roller 140 is located may be referred to as the first row and the row in which the second cleaning roller 150 is located may be referred to as the second row.

The first cleaning roller 140 includes two elastic layers 140*b* that are arranged on the shaft 140*a* at a predetermined interval and distributed symmetrically with respect to the center in the longitudinal direction (the Y direction). The two elastic layers 140*b* are arranged within the area of the maximum printable paper width Aw defined by the image formation apparatus 1000. Both end portions of the shaft 140*a* are held by the left and right support levers 103 via shaft bias parts 149R and 149L. At positions opposite the end portions of each elastic layer 140*b*, pressure members 145, serving as bias members, are held by the upper frame 161 and rotatably support the corresponding portions of the shaft 140*a*. The shaft bias part 149 corresponds to the shaft retainer 141 and the compression spring 142 illustrated in FIG. 3. Here, the pressures applied by the shaft bias parts 149R and 149L and the pressure members 145 are set to the same level.

The second cleaning roller 150 includes an elastic layer 150*c*, serving as a third elastic body, provided in the center area thereof, and two elastic layers 150*b* positioned on both sides of the elastic layer 150*c* in the longitudinal direction (Y-direction), to supplement the regions where the elastic layers 140*b* of the first cleaning roller 140 are absent in an area extending across and beyond the maximum printable paper width Aw. Each of the elastic layers 150*b* and 150*c* has a width that overlaps, within the overlapping region Sw, with the end portion of the opposing elastic layer 140*b* of the first cleaning roller 140. The pressure members 145 are located, in the longitudinal direction, in areas of the elastic layers 150*b* excluding the overlapping regions Sw.

Note that in the longitudinal direction (Y direction), the area where the elastic layer 140*b* exists corresponds to a first contact area and the area where the elastic layer 150*b* exists corresponds to a second contact area.

Both end portions of the shaft 150*a* are held by the left and right support levers 103 via shaft bias parts 159R and 159L. At positions opposite the end portions of each elastic layer 150*b*, a pressure member 155 are held by the upper frame 161 and rotatably holds the corresponding portions of the shaft 150*a*. The shaft bias part 159 illustrated in FIG. 5 corresponds to the shaft retainer 151 and the compression spring 152 illustrated in FIG. 3. Here, the pressures applied by the shaft bias parts 159R and 159L and the pressure members 155 are set to the same level.

The shaft bias parts 149 and 159, the pressure members 145 and 155, and the upper frame 161 collectively correspond to a bias mechanism.

That is, the elastic layers 150*b* and 150*c* of the second cleaning roller 150 and the elastic layers 140*b* of the first cleaning roller 140 are staggered in the longitudinal direction (Y direction) to form the overlapping regions Sw. Thus, the elastic layer 140*b* of the first cleaning roller 140 and the elastic layers 150*b* and 150*c* of the second cleaning roller 150 do not, by themselves, cover the entirety of the maximum printable paper width Aw, and are arranged such that one or more elastic layers 140*b* and one or more elastic layers 150*b*, 150*c* are present.

Here, the general process of heating and pressurizing at the nip portion 120 (FIG. 4A), the recording paper 1001, on which a toner image has been transferred but not yet fixed, will be described with reference to the image formation apparatus 1000.

When the recording paper 1001, on which the toner image is transferred by the transfer process in the image formation apparatus 1000 but has not yet been fixed, passes through the nip section 120 of the fixation device 100, the toner image is fixed to the recording paper 1001 and some of the unfixed toner adheres to the fixation belt 110. Thus, in a case where there is no cleaning roller provided, the adhered toner may come in contact with and transfer onto the next recording paper 1001, resulting a stain.

On the other hand, in a case where there is a cleaning roller provided, the unfixed toner adheres to the cleaning roller as it passes through a nip portion between the cleaning roller and the fixation belt, and can thereby be removed from the fixation belt (cleaning action).

Figure 12:
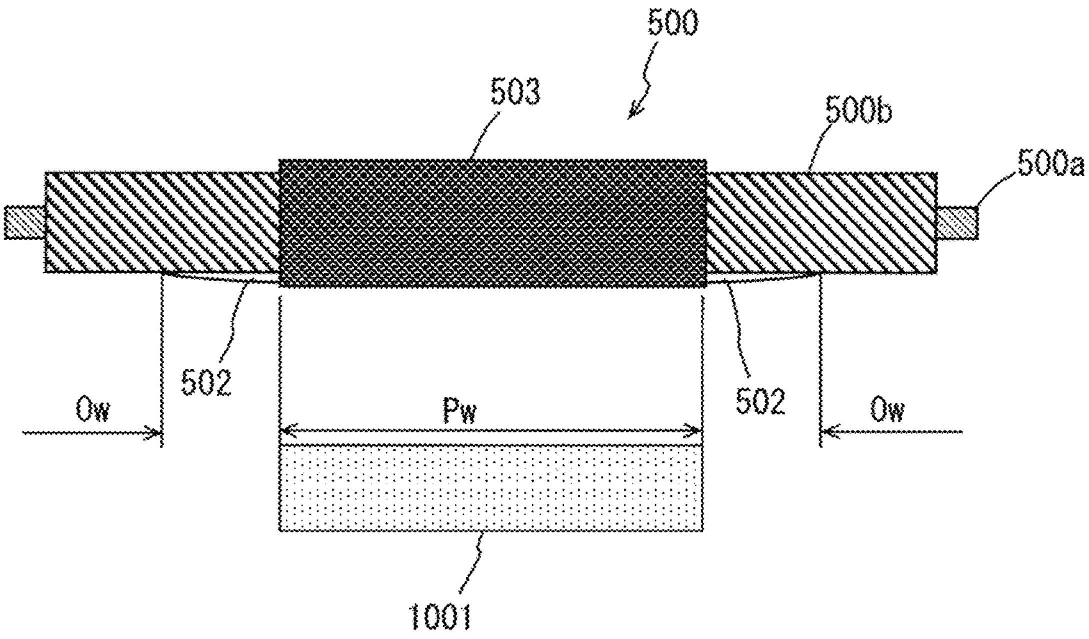
FIG. 12 is a schematic diagram of a cleaning roller as a reference example.

FIG. 12 is a schematic diagram of a cleaning roller 500 illustrated as a reference example. Instead of the first cleaning roller 140 and the second cleaning roller 150 illustrated in FIG. 5, the cleaning roller 500 is provided such that an elastic layer 500*b* of the cleaning roller 500 is pressed against the outer circumference of the fixation belt 110. In the configuration of this reference example, the single cleaning roller 500 covers the entire area of the maximum printable paper width defined by the apparatus.

In this case, the cleaning action described above is limited to the area where an adequate nip pressure is applied between the elastic layer 500*b* of the cleaning roller 500 and the fixation belt 110. If a pressure drop occurs due to various factors, such as uneven axial shape or flexure of the shaft 500*a*, the cleaning action may not function properly in that area, potentially resulting a stain.

Especially when the cleaning roller 500 has a small diameter, applying pressure only at both end portions can cause the shaft 500*a* to flex, resulting in a pressure drop at the central portion in the axial direction of the cleaning roller 500. To suppress this, a convex crown is sometimes provided in the center portion of the cleaning roller. However, due to the narrow diameter, the crown is difficult to manufacture, and the large crown-to-diameter ratio leads to significant variations during mass production and poor dimensional stability.

In response to the above-described issues, the fixation device 100 according to a first embodiment includes the first cleaning roller 140 and the second cleaning roller 150 that are configured to pressurize at multiple locations where each of the shaft 140*a* and the shaft 150*a* is exposed, thereby causing the nip pressure on the elastic layers 140*b*, 150*b*, and 150*c* uniform in the axial direction.

As described above, the shafts of the first cleaning roller 140 and the second cleaning roller 150 have the exposed portions at regions other than the end portions, which allows for pressurization at multiple positions in the axial direction. This configuration enables the formation of uniform nip pressure, even when the first and second cleaning rollers have small diameters.

Furthermore, by arranging multiple cleaning rollers having the same or similar configuration (e.g., the first cleaning roller 140 and the second cleaning roller 150 in a first embodiment) along the single fixation belt 110 (the member to be cleaned), multiple elastic layers (e.g., 140*b*, 150*b*, and 150*c* in a first embodiment) can be provided across the entire region of the maximum printable paper width in the axial direction.

Since the multiple elastic layers 140*b*, 150*b*, and 150*c* are separated in this manner, even if grease used for sliding inside the fixation belt 110 leaks, its transfer to other elastic layers can be suppressed, thereby suppressing poor rotation of the cleaning rollers or the like. This characteristic is particularly useful when an encoder is installed on the shaft of the first cleaning roller 140 or the second cleaning roller 150 to detect the rotation of the fixation belt 110.

In contrast, as illustrated in FIG. 12, in the configuration where the single cleaning roller 500 by itself covers the entire maximum printable paper width, if continuous printing is performed using a print pattern and recording paper having the width of a specified region Pw, toner may accumulate at particular areas on the cleaning roller 500, forming a toner layer 503.

In this case, the areas where the toner layer 503 accumulates have a larger diameter due to the thickness of the toner layer 503, resulting in pressure dropout areas 502 adjacent to the toner layer 503, which may lead to the formation of poor cleaning areas Ow. However, the areas in which the toner layer 503 is formed have cleaning capability because they do not have such pressure dropout areas therein and thus adsorb toner well.

Figure 6:
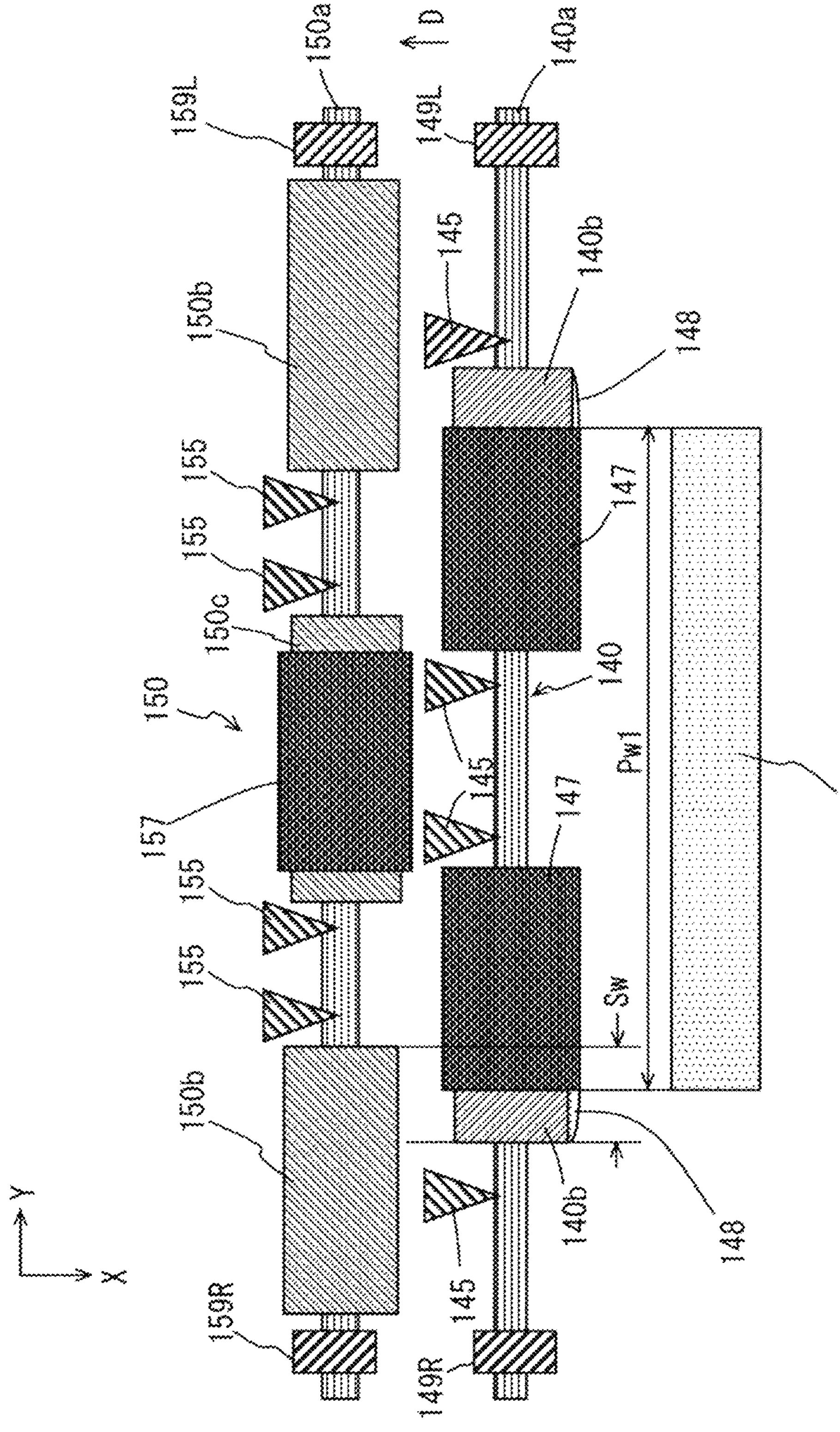
FIG. 6 is a diagram for explaining a case of continuous printing in a specified region Pw1, using a printing pattern on recording paper having the same width as the specified region Pw1.
Figure 7:
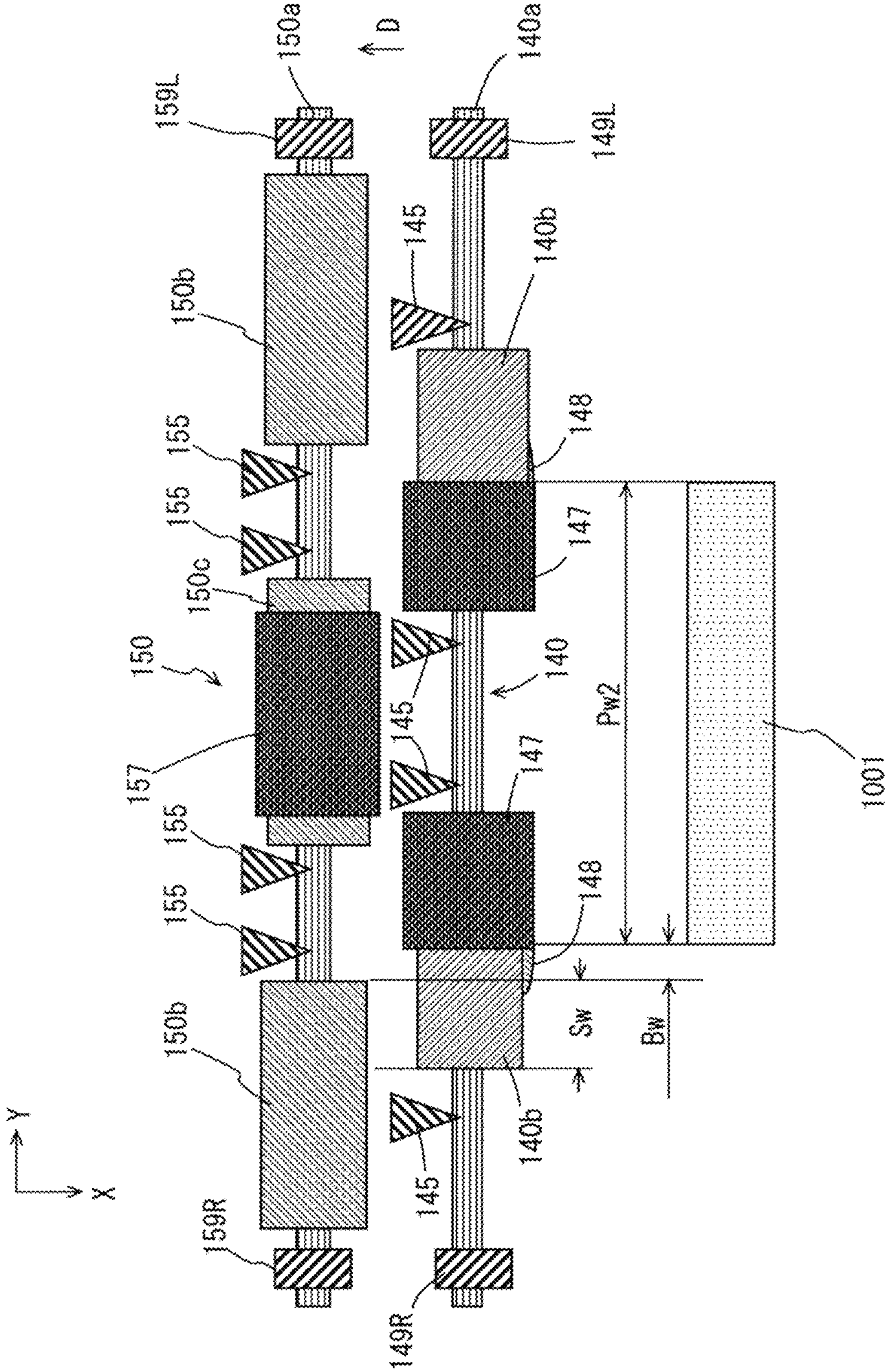
FIG. 7 is a diagram for explaining a case of continuous printing, in a specified region Pw2 which is narrower than the specified region Pw1, using a printing pattern on recording paper having the same width as the specified region Pw2.

To solve the above-described issues, the fixation device 100 according to a first embodiment is configured as described above. The operation of the fixation device 100 is described below. FIG. 6 is a diagram for explaining a case of continuous printing using a printing pattern and recording paper 1001 having a width of a specified region Pw1. FIG. 7 is a diagram for explaining a case of continuous printing using a printing pattern and recording paper 1001 having a width of a specified region Pw2, which is narrower than the specified region Pw1.

As illustrated in these Figures, the first cleaning roller 140 and the second cleaning roller 150 have the multiple elastic layers (140*b*, 150*b*, and 150*c*) that are arranged alternately in a staggered pattern along the direction of arrow D, which is the rotational (circumferential) direction of the fixation belt 110. In this case, in the specific region where the printing pattern is continuously printed on the recording paper, the toner layer is formed on the elastic layer(s) of the upstream cleaning roller, which first comes in contact with the outer circumference of the fixation belt 110 after passing through the nip portion 120, while no toner layer is formed, in the overlapping portion (overlapping region Sw), on the elastic layer(s) of the downstream cleaning roller.

Therefore, when the edge of the specified region Pw1 is located within the overlapping region Sw between the elastic layers 140*b* and 150*b* in the axial direction (Y-direction), as illustrated in FIG. 6, the toner layer 147 accumulates on portions of the two elastic layers 140*b* of the first cleaning roller 140 within the specified region Pw1, while the toner layer 157 accumulates on a portion of the central elastic layer 150*c* of the second cleaning roller 150 that corresponds to an area not overlapping with the two elastic layers 140*b* of the first cleaning roller 140.

Thus, when the edge of the toner layer 147 is located within the overlapping region Sw, each of the elastic layers 140*b* of the first cleaning roller 140 in the first row has the toner layer 147 and a pressure-drop portion 148, whereas each of the elastic layers 150*b* on the widthwise end portions of the second cleaning roller 150 in the second row has neither a toner layer 157 nor a pressure-drop portion. Therefore, no poor cleaning areas are generated across the entire axial direction.

For example, when borderless continuous printing is performed on A4-size recording paper having the width of the specified region Pw1, the toner adhering to the elastic layers 140*b* of the first cleaning roller 140, which is disposed upstream in the first row in the direction of arrow D, may become prominent, causing the toner layer 147 to thicken and increasing the likelihood of a pressure-drop portion 148. However, toner that adheres to the fixation belt 110 and passes through this pressure-drop portion 148 is subsequently removed by the second cleaning roller 150, which is disposed downstream in the second row.

In contrast, in the case where the edge of the specified region Pw1 is located closer to the center in the axial direction (Y-direction) than the overlapping region Sw between the elastic layers 140*b* and 150*b*, as illustrated in FIG. 7, the toner layer 147 accumulates on portions of the two elastic layers 140*b* of the first cleaning roller 140 within the specified region Pw2, while the toner layer 157 accumulates on a portion of the central elastic layer 150*c* of the second cleaning roller 150 that corresponds to an area not overlapping with the two elastic layers 140*b* of the first cleaning roller 140.

In this manner, when the edge of the toner layer 147 is located closer to the center than the overlapping region Sw, pressure-drop portions 148 are created adjacent to the toner layers 147 on the elastic layers 140*b* of the first cleaning roller 140 in the first row. However, the areas corresponding to the elastic layers 150*b* of the second cleaning roller 150 in the second row are to be cleaned by the elastic layers 150*b*. Therefore, depending on the positions of the toner layer 147 and the elastic layer 150*b*, a poorly cleaned area Bw may become smaller than the pressure-drop portion 148, as illustrated in FIG. 7.

Furthermore, in comparison with the configuration employing the single cleaning roller 500 as illustrated FIG. 12, a larger number of pressure points are provided by the pressure members 145, and pressure can be applied closer to the edges of the toner layer 147, thereby reducing the area in which the pressure drop portion occurs.

Note that, in a first embodiment described above, a case has been described in which the fixation device 100 equipped with the fixation belt 110 and the pressure roller 102 is configured with the first cleaning roller 140 and the second cleaning roller 150 for cleaning the fixation belt 110. However, the disclosure is not limited thereto. For example, such cleaning rollers 140 and 150 may also be provided for cleaning the pressure roller 102. Further, in a first embodiment described above, a case has been described in which the fixation belt unit 101 employing the belt-type system is employed as the heater. However, in the disclosure, a fixation device that uses a roller-type system may be employed instead. In this case, the opposing member 162 is not required.

In an embodiment described above, a case has been described in which the compression springs 146 and 156 serving as bias members are used for applying the biasing force to the first cleaning roller 140 and the second cleaning roller 150. However, the disclosure is not limited thereto. For example, any biasing method can be used, such as a twist spring, a plate spring, or even a weight attached to the shaft 140*a* and 150*a* to bias by its load.

Furthermore, in an embodiment described above, a case has been described in which the pressure members with different spring strengths and the like, such as the pressure members 145 and 155, are provided corresponding to the first and second cleaning roller 140 and 150. However, the disclosure is not limited thereto. For example, pressure members with the same characteristics may be provided, and the parts, components, and means for applying pressure are not limited. For example, in a case where a specific-width medium is expected to be frequently printed, the pressure applied by the cleaning roller in the first row may be set higher in the vicinity of that medium width than in the remaining areas.

Furthermore, in an embodiment described above, a case has been described in which the elastic layers 140*b* of the first cleaning roller 140 are arranged symmetrically with respect to the center in the axial direction and the elastic layers 150*b* and 150*c* of the second cleaning roller 150 are arranged symmetrically with respect to the center in the axial direction. However, the disclosure is not limited thereto. For example, each of the elastic layers 140*b* and 150*b* may be arranged asymmetrically, by arranging the elastic layers 140*b* and the elastic layers 150*b* only on the left side or right side, or by alternately arranging the same number of the elastic layers 140*b* and 150*b*.

As described above, according to the fixation device 100 of a first embodiment, the multiple cleaning rollers (140, 150) are provided on the single member to be cleaned (fixation belt 110). Accordingly, when a toner layer is formed by continuously printing using a print pattern and recording paper having a specific width, and the edge of the toner layer is located within the overlapping region Sw, no toner layer is formed on the elastic layer that is provided downstream. As a result, the occurrence of poor cleaning areas can be suppressed across the entire axial direction.

Furthermore, according to the fixation device 100 of a first embodiment, even if the edge of the toner layer is located outside of the overlapping region Sw, the presence of the elastic layer downstream of the pressure-drop portion can reduce the extent of the poor cleaning area accordingly. In addition, since pressure can be applied at exposed portions of the shaft even in the region other than both end portions of the cleaning rollers, pressure can be applied in the vicinity of the toner layer. Compared to a configuration in which a single cleaning roller covers the entire maximum printable paper width, this arrangement can reduce the range of pressure drop portions caused by the toner layer.

Second Embodiment

Figure 8:
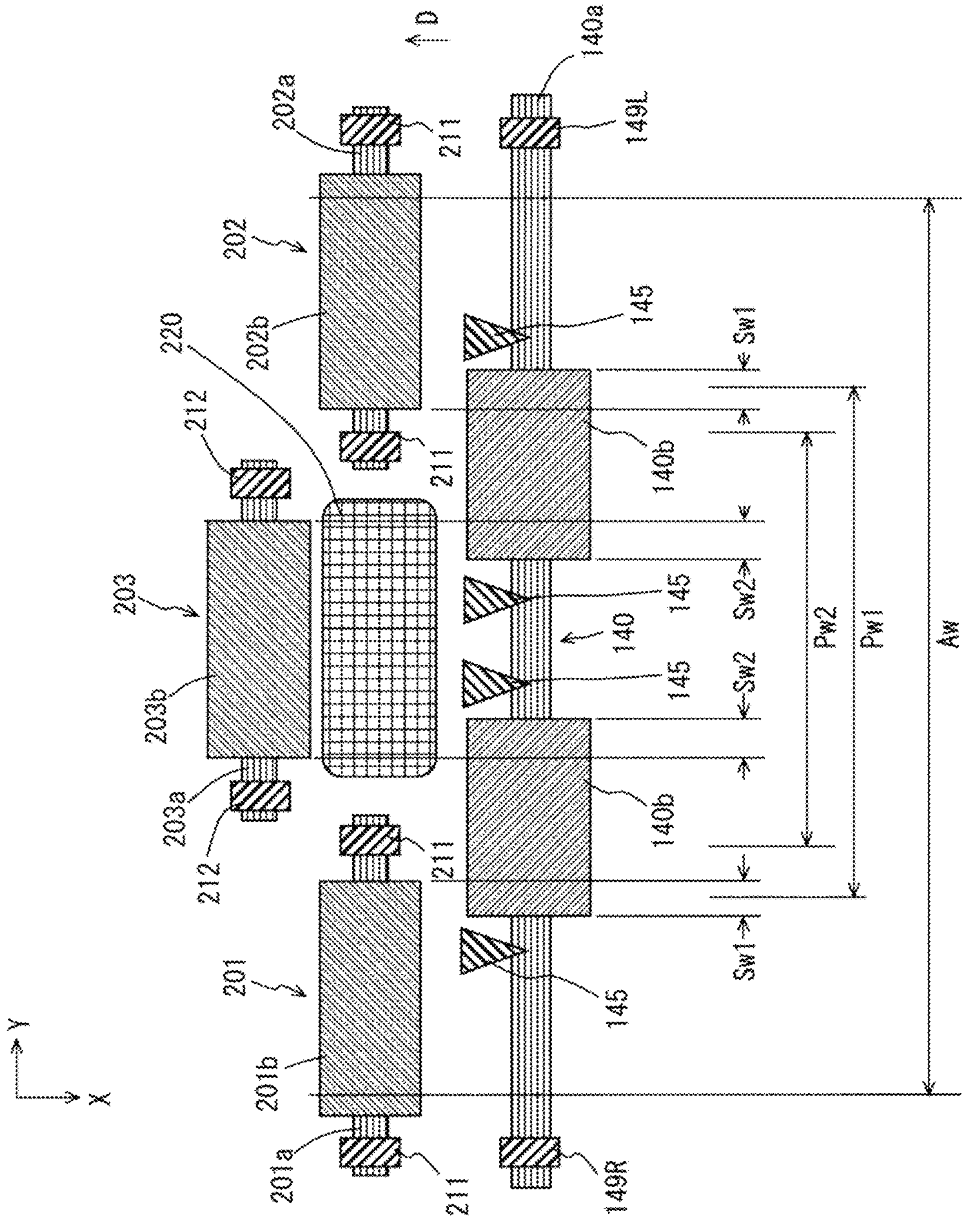
FIG. 8 is a schematic plan view for explaining the positional relationship in the longitudinal direction (Y direction) between a first cleaning roller, a third cleaning roller, a fourth cleaning roller, and a fifth cleaning roller according to a second embodiment.

FIG. 8 is a schematic diagram for explaining a positional relationship in a longitudinal direction (Y direction) among the first cleaning roller 140, a third cleaning roller 201, a fourth cleaning roller 202, and a fifth cleaning roller 203 according to a second embodiment.

The main difference between cleaning rollers of a second embodiment illustrated in FIG. 8 and those of a first embodiment illustrated in FIG. 5 is that, in a second embodiment, the third cleaning roller 201, the fourth cleaning roller 202, and the fifth cleaning roller 203 are arranged in place of the second cleaning roller 150 (FIG. 5).

Therefore, in a second embodiment, components of the fixation device that are common to those of the fixation device 100 in the first embodiment—except for the use of these cleaning rollers 201, 202, and 203 instead of the second cleaning roller 150—will be assigned the same reference numerals or omitted from the figures to avoid redundancy. The differences will be mainly described. Furthermore, the main configuration of the image formation apparatus according to a second embodiment is the same as that of the image formation apparatus 1000 according to a first embodiment illustrated in FIG. 1, except for the fixation device. Therefore, FIG. 1 will be referred to as necessary.

As illustrated in FIG. 8, in a second embodiment, the first cleaning roller 140 is located in the first row, the third cleaning roller 201 and the fourth cleaning roller 202 are located in the second row and coaxially arranged with a sensor area 220 positioned between them, and the fifth cleaning roller 203 is located in the third row.

The third cleaning roller 201 in the second row includes: a shaft 201*a* having approximately one-third the length of the shaft 140*a* of the first cleaning roller 140 in the first row; one elastic layer 201*b*; and a pair of pressurizing holders 211, each equipped with a bias member, which rotatably support the respective end portions of the shaft 201*a*, regulate the axial movement of the shaft 201*a*, and press the elastic layer 201*b* against the fixation belt 110 (see FIG. 2). Note that the pressurizing holders 211 are supported by the upper frame 161 (see FIG. 4A), which is not illustrated in FIG. 8, in the same or a similar manner as the pressure members 145 (see FIG. 4A).

In a second embodiment, the fourth cleaning roller 202 in the same row as the third cleaning roller 201 and the fifth cleaning roller 203 in the third row also have exactly the same configuration as the third cleaning roller 201.

Furthermore, in the direction of arrow D, which is the rotational movement direction of the fixation belt 110, two inner-side end portions of the elastic layers 201*b* and 202*b* in the second row form overlapping regions Sw1 with two outer-side end portions of the elastic layers 140*b* in the first row, and both end portions of the elastic layer 203b in the third row form overlapping regions Sw2 with two inner-side end portions of the elastic layers 140*b* in the first row.

In the configuration described above, when continuous printing is performed using a printing pattern and recording paper having the width of a specific region Pw1 and both ends of the specific region Pw1 are located within a pair of overlapping regions Sw1, a toner layer 147 (see FIG. 6) and pressure-drop portions 148 (see FIG. 6) are formed on the first cleaning roller 140 in the first row. However, no poor cleaning areas are generated in the entire axial direction. The reason why no poor cleaning areas are generated is the same as that explained in a first embodiment with reference to FIG. 6; therefore, a detail explanation is omitted here.

Similarly, when continuous printing is performed using a printing pattern and recording paper having the width of a specific region Pw2 and both ends of the specific region Pw2 are located closer to the center than the pair of overlapping regions Sw1, a toner layer 147 (see FIG. 7) and a pressure-drop portion 148 (see FIG. 7) are formed on the first cleaning roller 140 in the first row. However, the areas corresponding to the elastic layer 201*b* of the third cleaning roller 201 and the elastic layer 202*b* of the fourth cleaning roller 202, which are located downstream in the second row, are to be cleaned by the elastic layers 201*b* and 202*b*.

Therefore, depending on the positions of the toner layer 147 (see FIG. 7) and the elastic layers 201*b* and 202*b*, a poor cleaning area Bw (see FIG. 7) may become smaller than the pressure-drop portion 148 (see FIG. 7). The reason for this is the same as that explained in a first embodiment with reference to FIG. 7; therefore, the explanation is omitted here.

In a second embodiment described above, the sensor area 220 is provided in the central region of the fixation belt 110 in the width direction, and thus, a temperature sensor for the fixation belt 110 may be placed in this area, for example. Therefore, in addition to providing the same effects as in a first embodiment, greater flexibility in the layout in the fixation device can be offered. Furthermore, in a second embodiment described above, the second and subsequent rows of cleaning rollers are divided into smaller sections, which also allows for greater flexibility in the layout in the fixation device.

Third Embodiment

Figure 9A:
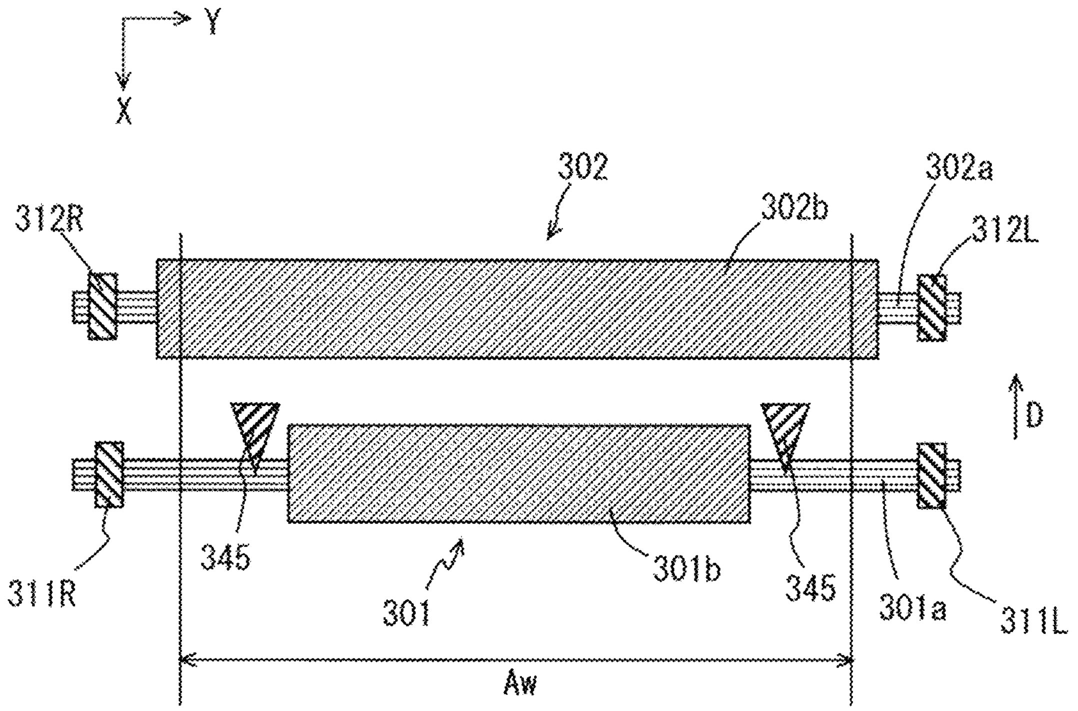
FIG. 9A is a planar schematic diagram for explaining a positional relationship between sixth and seventh cleaning rollers according to a third embodiment.

FIG. 9A is a planar schematic diagram for explaining a positional relationship among a sixth cleaning roller 301 and a seventh cleaning roller 302 according to a third embodiment.

The main difference between the cleaning rollers 301 and 302 according to a third embodiment illustrated in FIG. 9A and the cleaning rollers according to a first embodiment illustrated in FIG. 5 is that each of the sixth cleaning roller 301 and the seventh cleaning roller 302 according to a third embodiment includes only one elastic layer. Therefore, components of the fixation device of a third embodiment, employing the sixth cleaning roller 301 and the seventh cleaning roller 302, that are common to those of the fixation device 100 of a first embodiment described above will be given the same reference numerals or will not be illustrated in the drawings to avoid redundancy. The differences will be mainly described. Furthermore, the main configuration of the image formation apparatus according to a third embodiment is the same as that of the image formation apparatus 1000 according to a first embodiment illustrated in FIG. 1, except for the fixation device. Therefore, FIG. 1 will be referred to as necessary.

In a third embodiment, as illustrated in FIG. 9A, the sixth cleaning roller 301 in the first row includes: a shaft 301*a* that extends across and beyond the maximum printable paper width Aw in the width direction of the fixation belt 110 (arrow Y direction); and an elastic layer 301*b* that extends symmetrically with respect to the center within the maximum printable paper width Aw and covers the shaft 301*a* to have a roller shape. The seventh cleaning roller 302 in the second row includes: a shaft 302*a* and an elastic layer 302*b* that extends across and beyond the maximum printable paper width Aw in the widthwise direction.

A right end of the shaft 301*a* is supported by the right support lever 103R (see FIG. 3) via shaft bias part 311R, which includes the shaft retainer 141R and the compression spring 142R described in a first embodiment with reference to FIG. 3, and a left end of the shaft 301*a* is supported by the left support lever 103L in the same manner. Furthermore, pressure members 345 are arranged at positions corresponding to the portions of the shaft 301*a* where the elastic layer 301*b* is not formed and facing both edges of the elastic layer 301*b*.

Also, a right end of the shaft 302*a* is supported by the right support lever 103R (see FIG. 3) via a shaft bias part 312R, which includes the shaft retainer 151R and the compression spring 152R described in a first embodiment with reference to FIG. 3, and a left end of the shaft 302*a* is supported by the left support lever 103L via a shaft bias part 312L in the same manner.

Figure 9B:
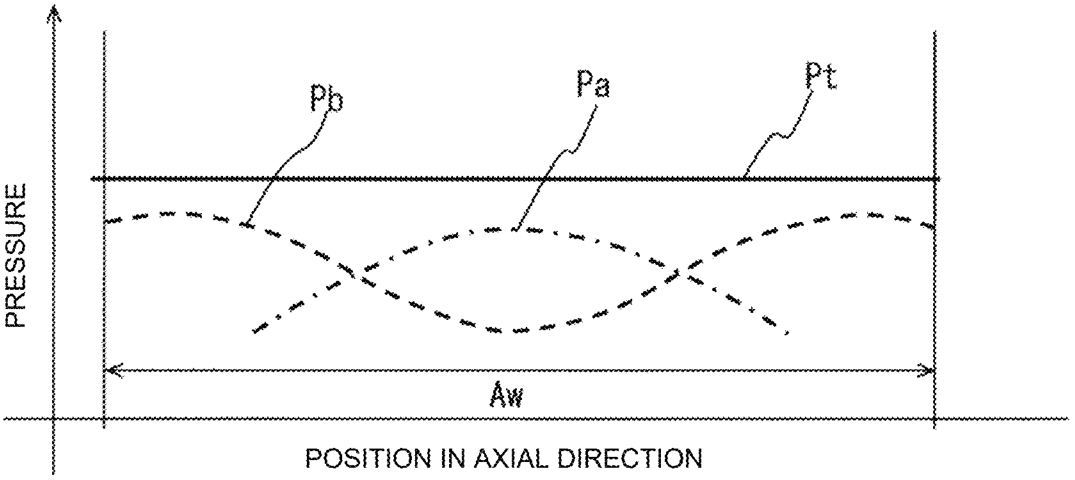
FIG. 9B is a diagram illustrating the pressure distribution of elastic layers in the maximum printable paper width Aw defined by the apparatus.

FIG. 9B illustrates the horizontal axis, which indicates the positions of the sixth cleaning roller 301 and the seventh cleaning roller 302 in the axial direction (arrow Y direction) and the vertical axis, which indicates the pressures applied to the fixation belt 110 by the elastic layer 301*b* of the sixth cleaning roller 301 and the elastic layer 302*b* of the seventh cleaning roller 302. In FIG. 9B, the single-dotted line indicates the pressure distribution Pa by the elastic layer 301*b*, and the dotted line indicates the pressure distribution Pb by the elastic layer 302*b*.

As illustrated in FIG. 9B, in the maximum printable paper width Aw defined by the apparatus, the pressure Pa generated by the elastic layer 301*b* has a characteristic in which no pressure is applied at the ends and the pressure peaks at the center, due to the limitation of the area of the elastic layer 301*b* and the effects of the pressure members 345, and the pressure Pb generated by the elastic layer 302*b* has a characteristic in which the pressure Pb is stronger at both end portions and weaker at the central portion of the elastic layer 302*b*, because the shaft 302*a* is held and pressed only at both end portions thereof by the pair of shaft bias parts 312R and 312L.

Therefore, the total pressure Pt, which is the sum of pressures Pa and Pb, is such that the pressures Pa and Pb complement each other at both end portions and the central portion of the maximum printable paper width Aw. Ideally, the total pressure Pt obtained by the combination of the pressure distributions Pa and Pb is approximately constant across the maximum printable paper width Aw, by setting the shape (such as the arrangement and length of the elastic layers) and characteristics (such as the biasing forces of the pressure members 345) of the respective components.

As described above, even in configurations where space for multiple elastic layers and pressure members is limited or unavailable, such as when the device width is limited, the fixation device according to a third embodiment can suppress pressure drops across the entire axial direction and provide cleaning capability across the entire maximum printable paper width in the axial direction.

Fourth Embodiment

Figure 10:
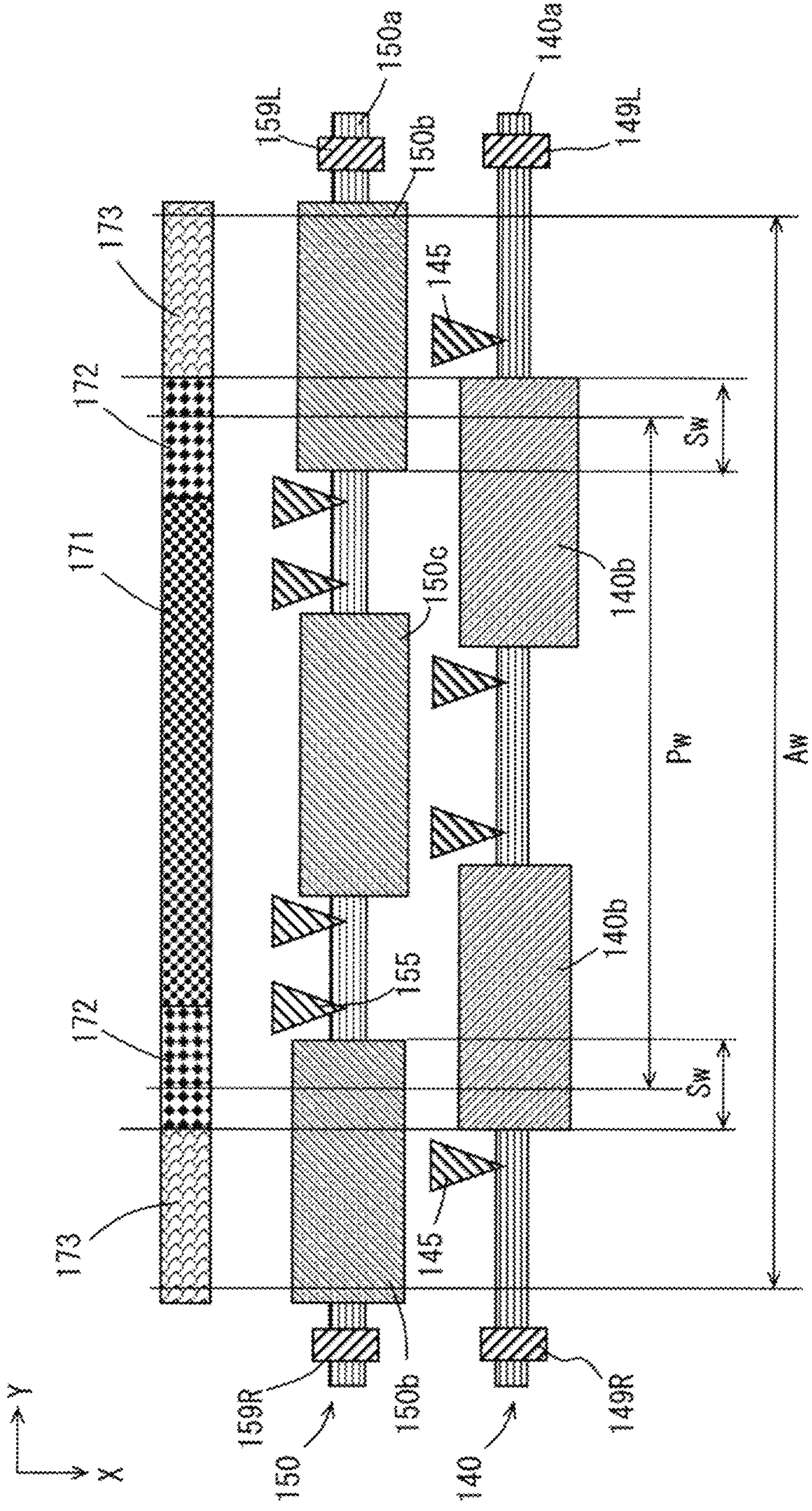
FIG. 10 is a schematic plan view for explaining the positional relationship in the width direction (arrow Y direction) between a first cleaning roller, a second cleaning roller, a main heater, two sub-heaters of type A, and two sub-heaters of type B according to a fourth embodiment.

FIG. 10 is a schematic plan view for explaining a positional relationship in the width direction (arrow Y direction) among the first cleaning roller 140, the second cleaning roller 150, a main heater 171, two sub-heaters 172, and two sub-heaters 173 according to a fourth embodiment.

The main difference between the fixation device according to a fourth embodiment illustrated in FIG. 10 and the fixation device 100 according to a first embodiment illustrated in FIG. 5 is that, instead of the heater 113 according to a first embodiment illustrated in FIG. 4B, a fourth embodiment provides separate heaters, including a main heater 171, two sub-heaters 172 of type A located on both outer sides of the main heater 171, and two sub-heaters 173 of type B located further on both outer sides of the sub-heaters 172. Therefore, the components of the fixation device according to a fourth embodiment, employing the main heater 171, the two sub-heaters 172, and the two sub-heaters 173, that are common to the components of the fixation device 100 (FIG. 2) of a first embodiment described above will be given the same reference numerals or will not be illustrated in the drawings to avoid redundancy. The differences will be mainly described. Furthermore, the main configuration of the image formation apparatus according to a fourth embodiment is the same as that of the image formation apparatus 1000 according to a first embodiment illustrated in FIG. 1, except for the fixation device. Therefore, FIG. 1 will be referred to as necessary.

In a fourth embodiment, as illustrated in FIG. 10, the main heater 171, serving as a first heating member, is arranged in a region corresponding to a first heating area at the central portion of the maximum printable paper width Aw, and extends symmetrically with respect to the center. The two sub-heaters 172, serving as second heating members, are arranged in regions corresponding to second heating areas that are continuous with both end portions of the first heating area. The two sub-heaters 173 are arranged in regions that are continuous with both end portions of the second heating areas.

The overlapping region Sw between the elastic layer 140*b* and the corresponding elastic layer 150*b* is provided on the outer side of the boundary position where the main heater 171 and the sub-heater 172 meet in the longitudinal direction (Y-direction), and is provided to include at least the boundary position where the sub-heater 172 and the sub-heater 173 meet in the longitudinal direction. In a fourth embodiment illustrated in FIG. 10, the boundary position where the sub-heater 172 and the sub-heater 173 meet coincides the outer edge of the overlapping region Sw in the longitudinal direction. Note that the main heater 171, the two sub-heaters 172, and the two sub-heaters 173 are positioned in the same location as the heater 113 illustrated in FIG. 4.

In the above-described configuration, when printing on recording paper having a width of the specific region Pw as illustrated in FIG. 10, the main heater 171 and the adjacent sub-heaters A172 are individually temperature-controlled, because the edges of the recording paper is located within the regions of the sub-heaters 172. In this case, because the heater is controlled to heat for the paper-through portion (the paper feeding portion), the temperature in the non-paper-through portion within the width of the sub-heater 172 rises excessively due to the absence of heat absorption by the passing recording paper. As a result, the temperature becomes excessively high at regions outside the paper width (the specified region Pw) within the heat generation width. Therefore, a fourth embodiment illustrated in FIG. 10 is configured such that the non-paper-through portion (the non-feeding portion) of the sub-heater 172 is included in the overlapping region Sw in the width direction.

As described above, a fourth embodiment described above is configured such that the non-paper-through region of the sub-heater 172, where the temperature tends to rises, overlaps with the overlapping region Sw. Accordingly, the heat in the non-paper-through region can be absorbed by both the elastic layer 140*b* and the elastic layer 150*b* in the overlapping region Sw. This configuration suppresses an excessive temperature rise of the non-paper-through region, thereby suppressing the fixation belt 110 from reaching a temperature that exceeds its heat resistance. As a result, it is possible to reduce damage to the fixation belt 110 and to minimize throughput degradation caused by control operations for protecting the fixation belt from overheating, such as idle rotation or reduction in conveyance speed.

Fifth Embodiment

Figure 11:
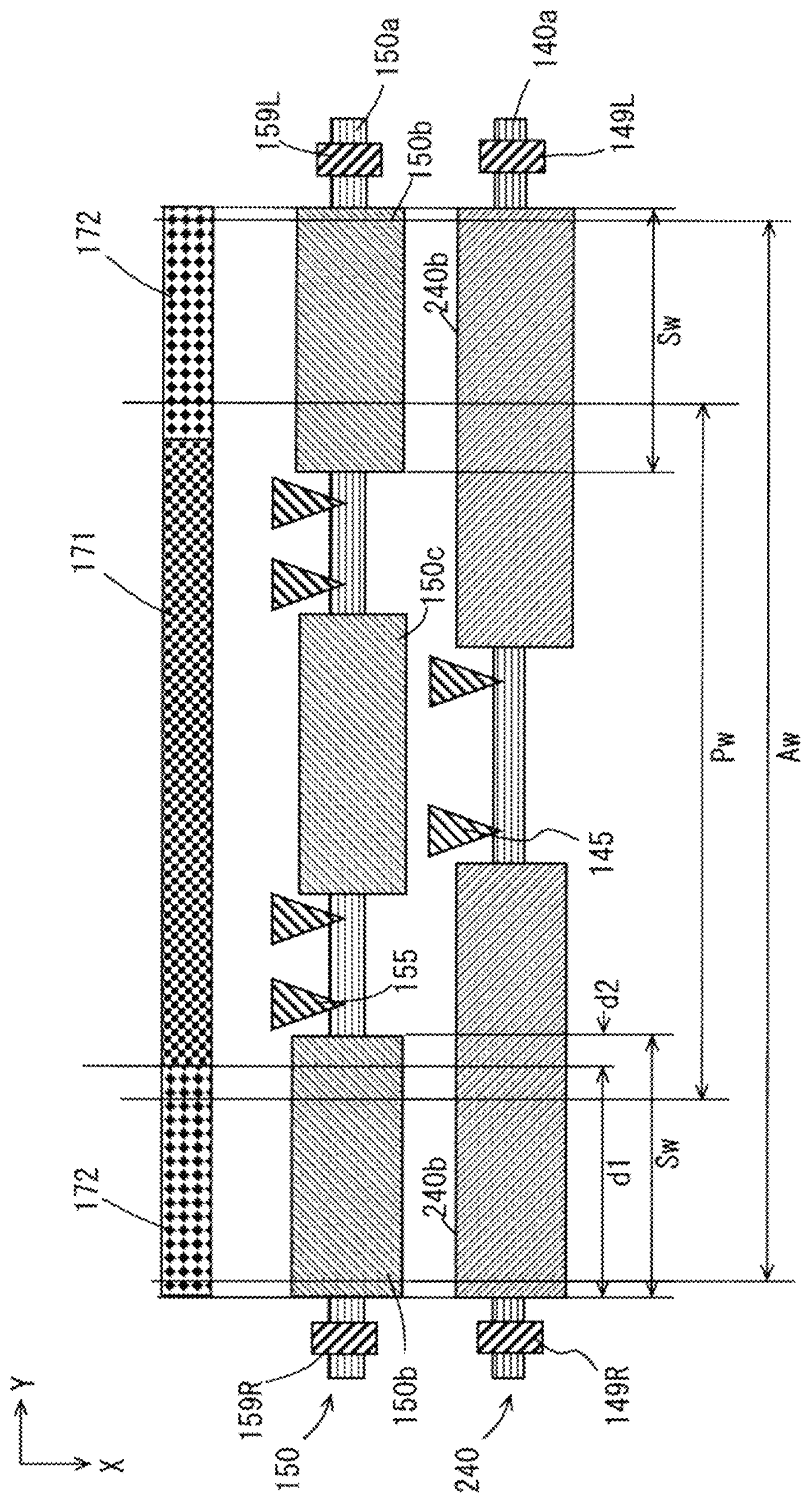
FIG. 11 is a schematic plan view for explaining the positional relationship in the width direction (arrow Y direction) between a first cleaning roller, a second cleaning roller, a main heater, and two sub-heaters of type A according to a fifth embodiment.

FIG. 11 is a schematic plan view for explaining a positional relationship in the width direction (arrow Y direction) among a first cleaning roller 240, a second cleaning roller 150, a main heater 171, and two sub-heaters 172 according to a fifth embodiment.

The main difference between the fixation device according to a fifth embodiment illustrated in FIG. 11 and the fixation device 100 according to a first embodiment illustrated in FIG. 5 is that, a fifth embodiment replaces the heater 113 illustrated in FIG. 4B with separate heaters including a main heater 171 and two sub-heaters 172 of type A located on both sides of the main heater 171, and replace the first cleaning roller 140 illustrated in FIG. 5 with a first cleaning roller 240 that has a different configuration from the first cleaning roller 140. Therefore, components of the fixation device of a fifth embodiment, employing the main heater 171, the two sub-heaters 172, and the first cleaning roller 240, that are common to those of the fixation device 100 of a first embodiment described above will be given the same reference numerals or will not be illustrated in the drawings to avoid redundancy. The differences will be mainly described. Furthermore, the main configuration of the image formation apparatus according to a fifth embodiment is the same as that of the image formation apparatus 1000 according to a first embodiment illustrated in FIG. 1, except for the fixation device. Therefore, FIG. 1 will be referred to as necessary.

In a fifth embodiment, as illustrated in FIG. 11, the main heater 171, serving as a first heating member, is arranged in a region corresponding to a first heating area at the central portion of the maximum printable paper width Aw, and extends symmetrically with respect to the center. The two sub-heaters 172, serving as second heating members, are arranged in regions corresponding to second heating areas that are continuous with both end portions of the first heating area.

The boundary position where the main heater 171 and the sub-heater 172 meet is located within the overlapping region Sw between the elastic layer 240*b* and the corresponding elastic layer 150*b*. The outer edge of the elastic layer 240*b* of the first cleaning roller 240 and the outer edge of the elastic layer 150*b* of the second cleaning roller 150 are both located at a position corresponding to or beyond the outer edge of the least sub-heater 172 in the axial direction. In an example illustrated in FIG. 11, the outer edges of the elastic layer 240*b* and the elastic layer 150*b* are both aligned with the outer edge of the sub-heater 172.

Accordingly, in a fifth embodiment, a pair of pressure members 145—facing the outer edge of each of the elastic layers 140*b* as illustrated in FIG. 5 according to a first embodiment—are omitted. Note that the main heater 171 and the two sub-heaters 172 according to a fifth embodiment are positioned in the same location as the heater 113 illustrated in FIG. 4.

In the above-described configuration, when printing on recording paper having the width of a specific region Pw as illustrated in FIG. 11, the main heater 171 and the adjacent sub-heaters 172 are individually temperature-controlled because the edges of the recording paper are located within the regions of the sub-heaters 172. In this case, because the heater is controlled to heat for the paper-through portion, the temperature in the non-paper-through portion within the width of the sub-heater 172 rises excessively due to the absence of heat absorption by the passing recording paper. As a result, the temperature becomes excessively high at positions outside the paper width (the specific region Pw) within the heat generation width.

Therefore, a fifth embodiment illustrated in FIG. 11 is configured such that the non-paper-through portion of sub-heater 172 is included in the overlapping region Sw in the width direction. The length d1 of the sub-heater 172 in the overlapping region Sw is greater than the length d2 of a portion of the main heater 171 in the overlapping region Sw.

As described above, a fourth embodiment is configured such that the non-paper-through region of the sub-heater 172, where the temperature tends to rises, overlaps with the overlapping region Sw. This configuration suppresses the temperature rise of the non-paper-through region by the means of the overlapping region, thereby suppressing the fixation belt 110 from reaching a temperature that exceeds its heat resistance. As a result, it is possible to reduce damage to the fixation belt 110 and to minimize throughput degradation caused by control operations for protecting the fixation belt from overheating, such as idle rotation or reduction in conveyance speed.

In the disclosure, the terms "upper," "lower," "left," "right," "front," "rear," and the like are used, but these are used for convenience for explanation and do not limit the absolute positional relationship in the state where the fixation device is arranged.

In one or more embodiments described above, a case has been described in which the image formation apparatus is the color printer, but the disclosure is not limited thereto, and the disclosure can be employed in an image formation apparatus such as a copier, a facsimile machine, and a multifunction peripheral (MFP). Also, the disclosure may be employed to a monochrome printer.

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A fixation device comprising:

a first rotation member extending in a first direction;

a plurality of cleaning members which are arranged in a circumferential direction of the first rotation member and each of which includes an elastic body configured to be in contact with the first rotation member to clean the first rotation member; and a biasing mechanism that biases the plurality of cleaning members toward the first rotation member, wherein the plurality of cleaning members comprises: a first cleaning member including a first support body and a first elastic body supported by the first support body; and a second cleaning member including a second support body and a second elastic body supported by the second support body, in the first direction, a second contact area where the second elastic body contacts the first rotation member includes an overlapping region that overlap a first contact area where the first elastic body contacts the first rotation member, and the overlapping region includes a position corresponding to a widthwise end of a predetermined-size medium that is subjected to fixing process of the fixation device, and the biasing mechanism includes a bias member that applies a biasing force to the first support body in a region different from the overlapping region in the first direction.

2. The fixation device according to claim 1, further comprising:

a first heating member that heats a first heating area of the first rotation member in the first direction; and a second heating member heats a second heating area of the first rotation member that is continuous with an end of the first heating area in the first direction, wherein the overlapping region is provided outside a position corresponding to a boundary between the first and second heating areas in the first direction and includes at least a part of the second heating area in the first direction.

3. The fixation device according to claim 1, further comprising:

a first heating member that heats a first heating area of the first rotation member in the first direction; and a second heating member that heats a second heating area of the first rotation member that is continuous with an end of the first heating area in the first direction, wherein in the first direction, the overlapping region includes a position corresponding to a boundary between the first and second heating areas.

4. The fixation device according to claim 3, wherein the overlapping region includes at least a part of the second heating area in the first direction.

5. The fixation device according to claim 3, wherein in the first direction, a length of a portion corresponding to the second heating area in the overlapping region is greater than a length of a portion corresponding to the first heating area in the overlapping region.

6. The fixation device according to claim 1, wherein the biasing force applied to the first support body by the biasing mechanism is greater at a central portion of the first support body than at an end portion of the first support body in the first direction.

7. The fixation device according to claim 1, wherein the second cleaning member includes the second support body, the second elastic body supported by the second support body, and a third elastic body supported by the second support body with a gap from the second elastic body, the first contact area includes an area corresponding to the gap in the first direction, and the biasing mechanism further includes a second bias member that applies a biasing force to the second support body in the gap.

8. An image formation apparatus comprising the fixation device according to claim 1.

* * * * *